Nov. 21, 1939.　　　R. E. RUNDELL ET AL　　　2,180,368
LEAF OPENER FOR TOBACCO STRIPPING AND BOOKING MACHINES
Filed Feb. 27, 1935　　　3 Sheets-Sheet 1

INVENTOR
Rupert E. Rundell
BY Gustaf E. Hagquist
Sydney J. Prescott
ATTORNEY

Nov. 21, 1939.    R. E. RUNDELL ET AL    2,180,368
LEAF OPENER FOR TOBACCO STRIPPING AND BOOKING MACHINES
Filed Feb. 27, 1935    3 Sheets-Sheet 2

Fig. 2.

INVENTOR
Rupert E. Rundell
BY Gustaf E. Hagquist
Sydney J. Prescott
ATTORNEY

Nov. 21, 1939.   R. E. RUNDELL ET AL   2,180,368
LEAF OPENER FOR TOBACCO STRIPPING AND BOOKING MACHINES
Filed Feb. 27, 1935   3 Sheets-Sheet 3
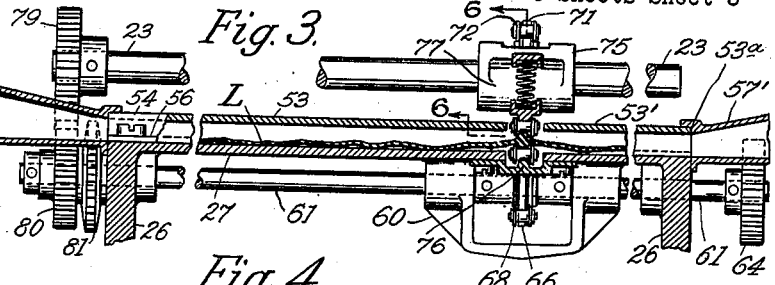
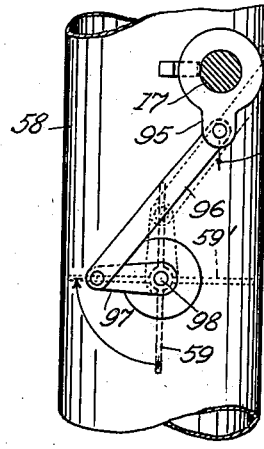
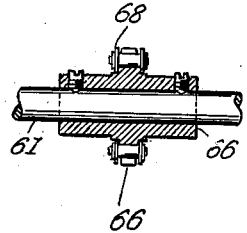
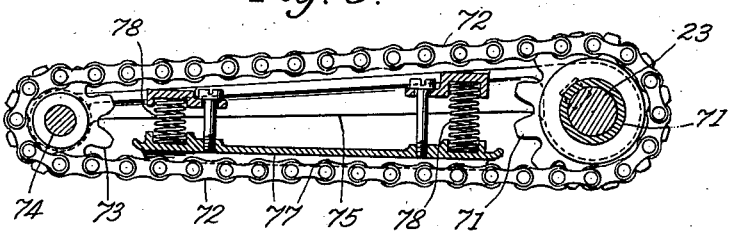
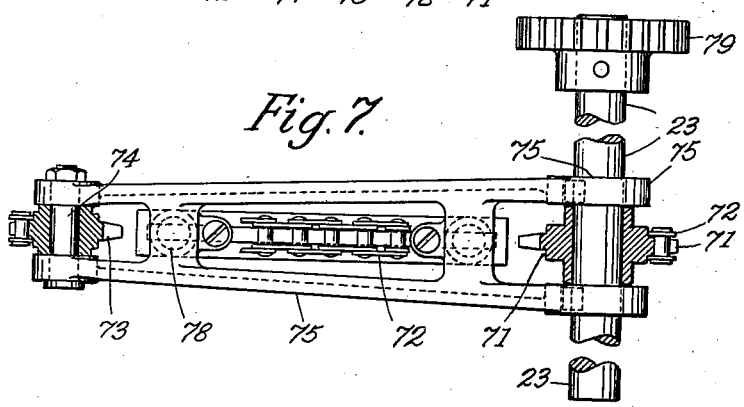
INVENTOR
Rupert E. Rundell
BY Gustaf E. Hagquist
Sydney Prescott
ATTORNEY Patented Nov. 21, 1939

2,180,368

UNITED STATES PATENT OFFICE 2,180,368

LEAF OPENER FOR TOBACCO STRIPPING AND BOOKING MACHINES

Rupert E. Rundell, Rockville Centre, and Gustaf E. Hagquist, Brooklyn, N. Y., assignors to International Cigar Machinery Company, a corporation of New Jersey Application February 27, 1935, Serial No. 8,560

22 Claims. (Cl. 131—57)

This invention relates to a leaf opener for booking and stripping machines and particularly to pneumatic means for cleaning and spreading leaves as they are guided or fed into bookers and strippers of the type commonly employed in preparing tobacco leaves for cigar binders, wrappers and filler tobacco.

In tobacco stripping and booking machines, an intermittently revolving drum or booking surface is commonly provided, divided into a right and left hand section, and around this drum which is somewhat greater in circumference than the length of the leaves to be stripped, the leaves are wrapped by a number of endless belts which are guided in the form of a loop by pulleys. As each leaf enters the drum, its stem portion is removed by suitable stripping elements co-acting with the drum, the stripped leaf portions being successively built up into books on the surface of the drum. In order to register successive leaf portions, the leaves are fed in so that their leading ends register with the leading end of the book of leaves carried by the booking drum.

In prior booking and stripping machines, a girl commonly fed the butt end of the leaf into the booker and stripper, spreading the leaves to the right and left of the stem as the stem and the leaf was drawn in. This spreading had to continue until the leaf was nearly completely fed into the machine.

One of the principal objects of the present invention is to save time and also produce a more certain and complete spreading of the leaf by mechanically or pneumatically spreading the leaf as it is fed into the machine. The invention therefore contemplates that after the girl has started the leaf and perhaps spread its foremost end, she may then devote her attention to getting the next leaf ready for introduction into the machine, while the spreading mechanism of the invention takes care of the remainder of the leaf.

Another principal object of the invention is to obtain a better quality of strip by pneumatically cleaning the strip to remove dirt and dust as the leaf is fed to the machine. Thus, not only does the present invention clean the leaf but it does this without increasing the booking and stripping time, in fact on the contrary through combining spreading with cleaning it decreases this time by relieving the operator of a certain amount of work. Another object is to obtain the cleaning or spreading referred to without interfering with the normal operation of the booking and stripping machine and without decreasing its accessibility.

Another object of the invention is to provide traveling gripping means for carrying the tip of the leaf and particularly the stem butt into the stripping and booking mechanism and to so synchronize this means with the booking mechanism that the leaves fed in will register with the book. An additional object is to provide for convenient separation of this gripping means to receive each leaf. The invention also contemplates connecting this feed means to the belts which hold the book on the booking drum so that when the ends of the belt loops are moved away from the drum to permit removal of a book, the gripping means will be actuated to move out of the way at the same time. It is also a part of the invention to provide for movement of the air chamber which produces the cleaning and spreading to an inoperative position to render the drum and book thereon accessible, and it is a further feature of the invention to provide for cutting off the suction on this chamber when the chamber is in inoperative position.

With these and other objects not specifically mentioned in view, the invention consists in certain constructions and combinations which will be hereinafter fully described and then particularly pointed out in the claims hereunto appended.

In the accompanying drawings in which like characters of reference indicate the same and like parts:

Fig. 2 is a plan view, partly in section and partly broken away, taken on the line 2—2 of Fig. 1;

Fig. 3 is a sectional end elevation on the line 3—3 of Fig. 1;

Fig. 4 is a detail view in side elevation of certain parts shown in Fig. 1;

Fig. 5 is a cross-section of a detail of Fig. 3;

Fig. 6 is a detail and side elevation on the line 6—6 of Fig. 3;

Fig. 7 is a detail plan view of the parts shown in Fig. 6.

Figure 1:
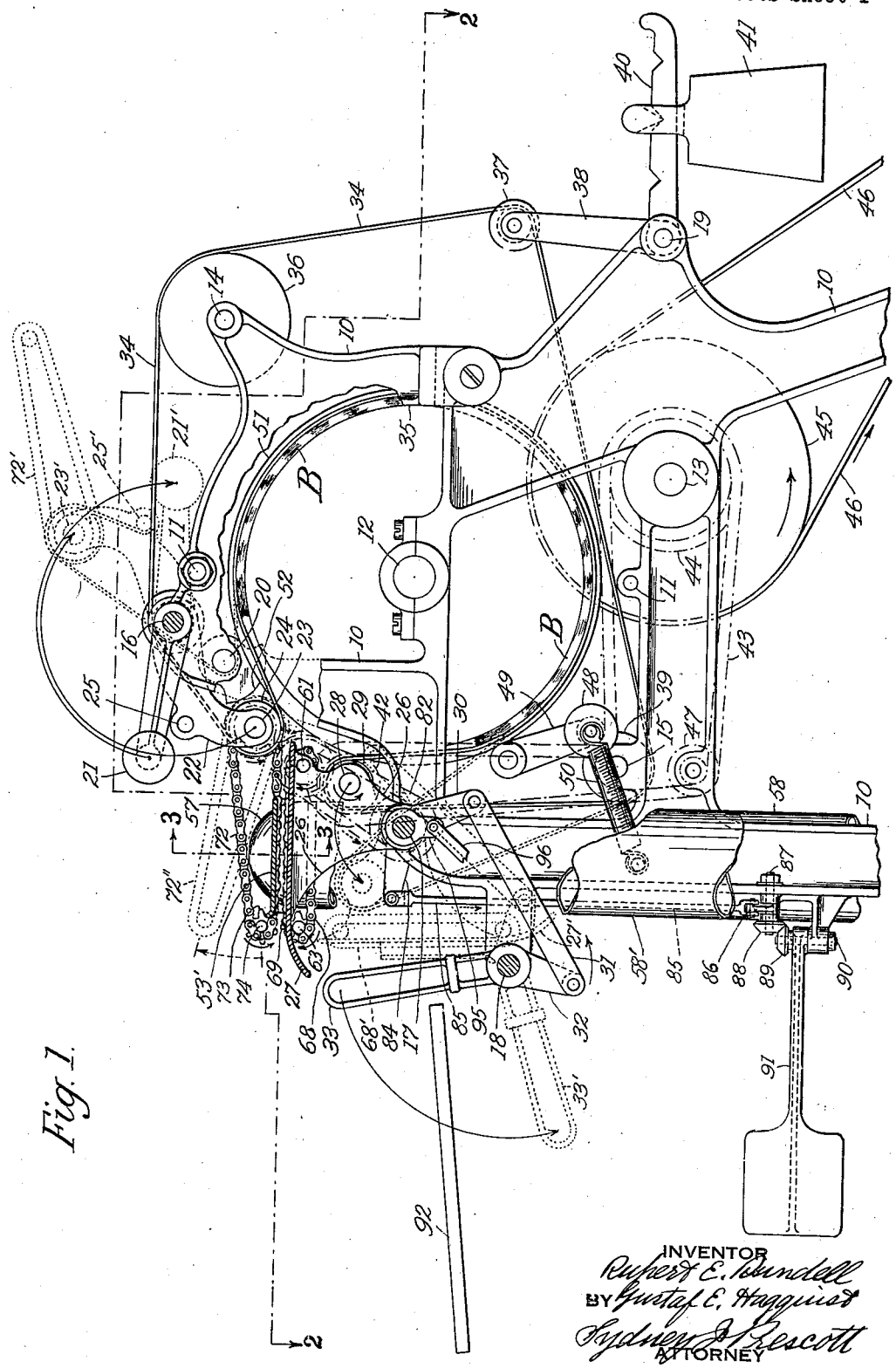
Fig. 1 is a side elevation partly in section of a mechanism embodying the invention.

Generally speaking, in the embodiments herein illustrated there is provided in combination with a leaf stripper and booker, including a rotary drum, and devices co-acting with the drum to hold leaves in a book thereon, a mechanism for guiding leaves between said booking drum and said devices, and pneumatic means for spreading the leaves prior to booking. This pneumatic means may take the form of a pair of suction chambers one on either side of the stem arranged to direct air outwardly from the stem along the surface of the leaf. In the best forms contemplated, mechanism may be provided for feeding the tobacco leaves to said booker and stripper which may comprise opposed gripping elements such as a pair of chains. Preferably these chains are mounted for separation to more conveniently receive a stem between them. Preferably also these gripping elements are driven in timed relation to the rotation of the drum to feed leaves into register with the book on the drum. In the embodiment illustrated, the feeding or gripping means and the chamber are movable to inoperative position to render accessible the book of leaves between the drum and said devices referred to. The various means referred to may be varied widely in construction within the scope of the claims, for the particular device selected to illustrate the invention is but one of many possible concrete embodiments of the same. The invention therefore is not to be restricted to the precise details shown and described nor to the particular embodiments chosen as illustrative of the invention.

Referring now to Figs. 1 and 2 of the drawings, the booking and stripping machine consists generally of suitable side frames 10 held together by tie rods 11, which carry the booking drum shaft 12, drive shaft 13, roller shafts 14 and 15 and fulcrum shafts 16, 17, 18 and 19. A stripping knife shaft 20 is also carried by these side frames.

For the purpose of removably supporting the end loops of the booking belts 34 which hold the book on the booking drum 35, the shaft 16 is arranged to be swung by a handle 21, and carries secured to it, arms 22 supporting between them a shaft 23 carrying rollers 24 over which pass the upper loops of the belts. The arms 22 also carry a rod 25 which retains the upper belt loops in their open position as shown in dotted lines in Fig. 1, when the handle 21 has been swung into dotted line position 21'.

The lead-in guide plate 27 which serves to guide the tobacco leaf as it is fed to the booking drum, is secured to brackets 26 fastened to shaft 17. This shaft 17 can be swung by means of suitable crank arms 30 connected by links 31 to arms 32 on the shaft 18. One of the latter arms is provided with a handle by means of which the guide plate can be swung to inoperative dotted line position 33', as shown in Fig. 1, for the purpose of rendering the space between the upper and lower booking belt loop ends accessible to remove the book and get at the stemming knife.

The booking belts 34 which surround the major portion of the circumference of the drums 35 are looped around rollers 24 on the shaft 23, and run over a roller 36 on the shaft 14, over flanged rollers 37 carried by arms 38 fast on shaft 19, and over rollers 39 on shaft 15, and are finally looped around rollers 29 on shaft 28. From the hubs 38' of arms 38 extend arms 40 on which are hung weights 41 which keep the belts 34 at a constant tension as the thickness of the leaf book B on drum 35 increases during the operation of the machine.

The booking drum 35 is driven from shaft 28 by the belts 34, the shaft 28 having a sprocket 42 driven by a chain 43 from a sprocket 44 on shaft 13 on which is also mounted a pulley 45 driven by a belt 46. The chain 43 runs over idlers 47 and 48, the latter of which is carried by an arm 49 pivoted to frame 10 and held under tension by a spring 50 to enable the chain 43 to follow the movement of shaft 28 when the same is swung into the dotted position (at the end of the arrow in Fig. 1) by turning handle 33. The two halves of the booking drum 35 are separated by flanges 51 with which engage the edges of a knife 52 mounted on shaft 20.

Upon the leaf guide plate 27, which is provided with a longitudinal central slot, are mounted two suction chambers 53 and 53', Figs. 2 and 3, partly closed in front and rear by end walls 54 and 55, respectively, which have flange extensions 56 for fastening the same to plate 27. The suction chambers 53 and 53', by means of connecting heads 57 and 57', communicate with suction pipes 58 and 58' in each of which a valve 59 is provided to shut off the suction in the chambers 53 and 53' whenever the plate 27 is moved out of its operating position by turning handle 33.

The means for gripping the leaf stems and carrying the leaves through the chambers and to the booker and stripper will now be described. It will be noted that the chambers 53, 53', move with this plate 27 being permitted motion relative to the stationary suction conduits 57 and 57', by sliding connections at 53a (Fig. 3).

The end brackets 26 of plate 27, together with a bracket 60 extending across the rear end of the central slot of plate 27, support a shaft 61, and lugs 62 at the front end of the slot support a stud 63. Shaft 61, on one side of the machine shown near the bottom of Fig. 2, has fixed thereon a gear 64 in mesh with a gear 65 on the driven shaft 28. Projecting through the slot of plate 27, shaft 61 carries a fixed sprocket 66, Fig. 5. By the sprocket 66, the motion of shaft 61 is transmitted to a chain 68 running over a sprocket 69 loose on stud 63. Since the shaft 61 carries secured to it the sprocket 66 and thus drives the same, the chain 68 will be positively driven and will at the same time grip the stem of the leaf (as shown in Fig. 3) against the upper chain which may run idle and will carry said chain along with the stem. The opposed gripping chains 68 and 72 thus serve to grip and forward the stem of the leaf endwise.

The leaf gripping and forwarding chains 68 and 72 run at the same linear speed as the circumference of drum 35, and are arranged to grip the stem of the incoming leaves between them, the upper loop of the lower chain 68 being supported by a rail 76 attached to the bottom of plate 27, Fig. 3, and the lower loop of the upper chain 72 being pressed downward by a rail 77 suspended from cross-ribs of arm 75 and tensioned by compression springs 78, Figs. 6 and 7.

It is desirable that the gripper chains 68 and 72 be readily parted to receive leaves between them. For this purpose the shaft 23, on which the loop rollers 24 are journaled, carries at one end as shown near the top of Fig. 2, a fixed gear 79, which, when the shaft 23 is in operating position, rests on and meshes with a gear 80 attached to the hub of a sprocket 81 loose on shaft 61. A chain 82 connects the sprocket 81 with a sprocket 83 loose on shaft 17 and carries on its hub an arm 84 linked by a vertical rod 85 to an arm 86 on a horizontal shaft 87 rotatable in frame 10. Fast to the arm 86 is a bevel gear 88 meshing with a bevel gear 89 on a vertical shaft 90 rotatable in a bracket on frame 10 and carrying a horizontal arm 91 terminating in a vertical treadle.

Thus, by using arm 91 as a knee lever (desirable because on conventional machines both feet are occupied by starting and stopping pedals), the operator sitting in front of a shelf 92 attached by suitable brackets to frame 10, can conveniently raise the upper chain conveyor 72 into position 72'', Fig. 1, when inserting a leaf L into the leaf opener, the chain 72 upon cessation of the knee pressure swinging back and gripping the stem of the inserted leaf by the action of a spring 93 attached to knee lever 91 and anchored to a pin 94 affixed to frame 10.

When the handle 21 is turned into the dotted position 21' for the removal of a completed book B, the upper chain conveyor is carried by the swinging arms 22 into the open position 72' shown in dotted lines in Fig. 1. This serves to render the booking drum accessible for removal of the book of leaves.

When the handle 33 is turned for swinging out roller shaft 28, the guide in plate 27, being integral with the swing arms 26, moves into the dotted position 27' shown in Fig. 1, with the conveyor chain 68 in position 68' and with its attached suction chambers 53, 53' away from the mouths of the connecting heads 57 and 57'. In order to shut off the suction pipes 58 during this time, the ends of fulcrum shaft 17 carry crank arms 95, Fig. 4, connected by links 96 to crank arms 97 mounted on the spindles 98 of valves 59 in pipes 58. When the shaft 17 is turned outward by the handle 33 and linkage 32, 31, 30, the crank arms 95 and connecting links 96 move the valves from their open position 59, into the closed position 59, shown in dotted lines, and when shaft 17 is turned back, the valves are automatically reopened by the same linkage.

The operation of this mechanism has been described in connection with the description of the several parts. It may be noted however that the mechanism disclosed is designed for use in connection with bookers and strippers of the general type disclosed in the patent to Graham H. Jackson No. 1,366,386, dated January 25, 1921. In this type of machine the rotation of the booking drum is controlled by an automatic one-revolution stop clutch which serves to stop the booking drum together with the book thereon at a predetermined position of the drum once during every revolution of the drum. In this type of machine, the forward edge of the book is thus stopped a little below the guide plate, corresponding to guide plate 27 so that when the machine is started (ordinarily through the operator actuating a foot pedal), the forward edge of a leaf started into the machine at that time will just register with the forward end of the book.

In the present construction, the same arrangement is utilized except that the conventional booking machine one revolution clutch is adjusted to stop the drum with the book somewhat further below the plate 27, as shown in Fig. 1, so that a leaf started under the forward end of the chain 72 will reach the drum at the same time the forward edge of the book arrives adjacent said plate 27; thus the connecting of the chains 72 and 68 to the pulley shafts of the booking belts which have the same peripheral speed, as the booking drum, serves to feed the tobacco leaves in timed or synchronized relation to the movement of the booking drum and thus properly registers the cleaned, spread and stripped leaves with the book on the drum.

What is claimed is:

1. In a booking and stripping machine, the combination with a rotary booking drum, of a stripper for separating the stems of tobacco leaves from the blade portions thereof, mechanism for feeding tobacco leaves to said stripper and drum, said mechanism including means for gripping and feeding the stems of the leaves along a predetermined path of travel until the leaves are in partially booked position, pneumatic means cooperating with said stripper for directing air onto and spreading the surface of the leaves being fed to said stripper, and means connecting said mechanism and booking drum for movement in timed relation.

2. In a booking and stripping machine, the combination with a rotary booking drum, of a stripper for separating the stems of tobacco leaves from the blade portions thereof, mechanism for feeding tobacco leaves to said stripper and drum, pneumatic means cooperating with said stripper for directing air on and spreading the surface of the leaves being fed to said stripper, said mechanism including opposed traveling gripping elements for gripping and feeding forward along a predetermined path of travel until the leaves are in partially booked position the stems of the leaves, and means connecting said mechanism and said booking drum for movement in timed relation.

3. In a booking and stripping machine, the combination with a rotary booking drum, of a stripper for separating the stems of tobacco leaves from the blade portions thereof, mechanism for feeding tobacco leaves to said stripper and drum, and pneumatic means for directing air on and spreading the surface of the leaves being fed, said mechansim including opposed endless flexible stem gripping elements moving said leaves through said means to said stripper along a predetermined line of travel until the leaves are partially booked.

4. The combination with a tobacco leaf stripper and booker having a rotary booking drum and devices co-acting with the drum to hold leaves in book formation thereon, of mechanism for guiding tobacco leaves into position between said drum and devices to book them, and pneumatic means co-acting with said mechanism to spread the leaves as they are guided to said position, said pneumatic means maintaining at least a portion of the leaf in a spread condition until the booking mechanism has partially operated on the leaf.

5. The combination with a tobacco leaf stripper and booker having an endless supporting surface for a book of leaves and devices co-acting therewith to hold the book on said surface, drive means for advancing said surface, and mechanism driven in timed relation to the movement of said surface for feeding tobacco leaves to said stripper and booker with the forward end of the leaf in registry with the forward end of a book of leaves on said surface, said mechanism comprising endless traveling members gripping a substantial portion of the stem of each leaf being fed, and pneumatic means coacting with said mechanism for directing air along the surface of the leaves to spread them as they are being fed by said mechanism to said booker and stripper the stems of said leaves being fed by said mechanism along a predetermined path of travel until the same are in partially booked position.

6. The combination with a tobacco leaf booker having a rotary booking drum and driving means for rotating said drum, of mechanism driven in timed relation with the movement of said drum for feeding tobacco leaves to said booker and on to the surface of said drum with the forward end of the leaf in registry with the forward end of a book of leaves on said surface, and pneumatic means located on opposite sides of said mechanism and cooperating therewith for driving a current of air along the surface of the leaves to clean and spread the same while said mechanism advances leaves past said pneumatic means to said booker the stems of said leaves being fed by said mechanism along a predetermined path of travel until the same are in partially booked position.

7. The combination with a tobacco leaf booker having a rotary booking drum and a drive for driving the same, of mechanism driven in timed relation to the rotation of said drum for feeding tobacco leaves to said booker and on to said drum, an air chamber through which said mechanism carries the tobacco leaves and operative on opposite sides thereof, and a conduit connecting said air chamber with a source of suction, said chamber being arranged to clean said leaves and hold them in outspread condition during at least a part of their advance to said drum the stems of said leaves being fed by said mechanism along a predetermined path of travel until the same are in partially booked position.

8. The combination with a tobacco leaf booker including a rotary booking drum, of mechanism for guiding leaves into the range of operation of said booker, said mechanism including means feeding the stems of said leaves along a predetermined path of travel until the same are in partially booked position and also including pneumatic means for directing air along the surface of the leaves to clean and spread the same, said mechanism including a substantially horizontal feeding table adjacent said booker on which leaves are adapted to be manually spread by the operator and said pneumatic means coacting with said table to act on the manually spread leaves thereon.

9. The combination with a tobacco leaf booker including a rotary booking drum, of mechanism for guiding leaves into the range of operation of said booker including pneumatic means for directing air along the surface of the leaves to clean and spread the same, the stems of said leaves being fed by said mechanism along a predetermined path of travel until the same are in partially booked position, said pneumatic means including a chamber through which the blade of the leaf passes, provided with an opening adjacent the stem and another opening adjacent the longitudinal edge of the leaf, and means producing a current of air along the surface of the leaf from one opening to the other, said chamber being arranged to confine the air current closely to the surface of the leaf blade, said mechanism including a substantially horizontal feed table adjacent said booker on which the leaves are adapted to be manually spread by an operator and said pneumatic means cooperating with said table to act on the manually spread leaves thereon.

10. The combination with a tobacco leaf booker and stripper including a rotary booking drum, of means for guiding leaves into the range of action of said stripper and booker and on to said drum, pneumatic means for directing air on to the surface of the leaves being guided into the booker and stripper, mechanism supporting said pneumatic means for movement into and out of operative position to render parts of the booker and stripper more accessible.

11. The combination with a tobacco leaf booker and stripper including a rotary booking drum, of means for guiding leaves into the range of action of said stripper and booker and on to said drum, pneumatic means for directing air on to the surface of the leaves being guided into the booker and stripper, mechanism supporting said pneumatic means for movement into and out of operative position to render parts of the booker and stripper more accessible, an air conduit in communication with said pneumatic means, and means for automatically closing said conduit when said pneumatic means is moved to inoperative position.

12. The combination with a rotary booking drum, of belts co-acting with said drum to receive a book, leaf spreading and cleaning means arranged to feed leaves into operative relation to said belts and booking drum, said spreading and cleaning means including an air chamber for directing air from the stem portion of the leaf outwardly towards the edges thereof, said air chamber including air conduits and a chamber portion through whch the leaf passes, and means mounting the chamber portion for movement relative to the conduits to move the same away from the booking drum.

13. The combination with a rotary booking drum, of belts co-acting with said drum to receive a book, means for guiding tobacco leaves into a position between the drum and the belts, and vacuum cleaning means arranged on opposite sides of said means to act on the leaves as they are guided to said position, said vacuum cleaning means being positioned less than the length of a leaf from said booking drum to act on same during the booking operation.

14. In a tobacco leaf stripping and booking machine, the combination with a rotary booking drum, of cutting means co-operating with said drum to cut the stem from a tobacco leaf fed on to the periphery of said drum, pneumatic leaf spreading means adjacent said drum including an air chamber, stem gripping means for gripping the stem of the leaf along its length and feeding a leaf through said chamber to said cutting means, said gripping means feeding the stems of the leaves along a predetermined path of travel until the leaves are in partially booked relation.

15. In a tobacco leaf stripping and booking machine, the combination with a rotary booking drum, of cutting means co-operating with said drum to cut the stem from a tobacco leaf fed on to the periphery of said drum, pneumatic leaf spreading means adjacent said drum including a substantially horizontal air chamber acting upon leaves fed to said drum, stem gripping means for gripping the stem of the leaf along its length and feeding a leaf through said chamber to said cuting means, and connections between said booking drum and said gripping means for operating the same in timed relation to synchronize the feeding to the drum of an outspread leaf with the book on the drum, said gripping means feeding the stems of the leaves along a predetermined path of travel until the leaves are in partially booked relation.

16. In a tobacco leaf stripping and booking machine, the combination with a rotary booking drum, of cutting means co-operating with said drum to cut the stem from a tobacco leaf fed on to the periphery of said drum, stem gripping means for gripping the stem of the leaf and feeding a leaf to said means, connections between said booking drum and said gripping means for operating the same in timed relation to synchronize the feeding to the drum of an outspread leaf with the book on the drum, said gripping means including opposed endless flexible elements, and booking belts extending around said drum to hold a book of leaves thereon, pulleys over which end loops of said belts pass, and means connected to said elements and said pulleys to swing both bodily away from the drum to render the drum accessible.

17. The combination with a rotary tobacco leaf booking drum, of belts having loops surrounding said drum except for a space between opposite ends of the belt loops, means including opposed traveling stem gripping elements for feeding leaves into the space between said loop ends, mechanism mounting at least one of said loop ends for movement away from the drum to give access to the drum, and connections between said mechanism and said means to move a part of said means away from an opposed part thereof along with said loop end.

18. The combination with a rotary tobacco leaf booking drum, of belts having loops surrounding said drum except for a space between opposite ends of the belt loops, means including opposed traveling stem gripping elements for feeding leaves into the space between said loop ends, mechanism mounting at least one of said loop ends for movement away from the drum to give access to the drum, and connections between said mechanism and said means to move a part of said means away from an opposed part thereof along with said loop end, said opposed traveling elements comprising chains.

19. The combination with a substantially horizontal plate on which the forward ends of tobacco leaves may be spread by an operator, said plate having a slot therein, of stem gripping means including a part extending through said slot and adapted to engage the stem of a tobacco leaf on the plate, mechanism co-acting with said gripping means to cause the same to pull a leaf across said plate, wall members co-operating with said plate to form a horizontal air chamber through which the leaf is drawn by said means and mechanism, means for producing a current of air through said chamber and along the surface of a leaf therein, and stripping and booking devices positioned to act on the leaf as it is acted upon by said air current.

20. In a tobacco leaf stripping and booking machine, the combination with a stripper for stripping the stems from tobacco leaves fed lengthwise thereto, of a booker arranged to receive stripped leaves from said stripper and book them, leaf cleaning and spreading means operating to clean and spread out leaves fed to said stripper, and means mounting said spreading means for bodily movement to inoperative position away from said stripper and booker to render them more accessible, and mechanism normally holding said spreader in operating position.

21. The combination with a tobacco leaf stripper and booker having a rotary booking drum and devices coacting with the drum to hold leaves in book formation thereon, of mechanism for guiding tobacco leaves into position between said drum and devices to book them, pneumatic means including spaced plates between which the laminae of leaves extend co-acting with said mechanism to spread and clean the leaves as they are guided to said position, said mechanism comprising opposed gripping elements for gripping the stem of a leaf along its length, and means for imparting motion to said elements to feed said stem endwise into the range of action of said pneumatic means and stripper, the stems of said leaves being fed by said gripping elements along a predetermined path of travel until the same are in partially booked position.

22. The combination with a tobacco leaf stripper and booker having a rotary drum and devices coacting with the drum to hold leaves in book formation thereon, of mechanism for guiding leaves into position between said drum and devices to book them, and means coacting with said mechanism to spread the leaves as they are guided to said position, said means maintaining at least a portion of the leaf in spread condition until the booking mechanism has partially operated on the leaf, said mechanism comprising a substantially horizontal guide plate extending adjacent said means and arranged to support leaves fed thereby, and endless flexible members positioned to engage the stems of leaves fed over said plate and thereby control the introduction of a stemmed leaf to said drum.

RUPERT E. RUNDELL.
GUSTAF E. HAGQUIST.